Feb. 14, 1956 J. A. SCARDINA 2,734,737
FLAME CUTTING MACHINE
Filed May 2, 1952 4 Sheets-Sheet 1
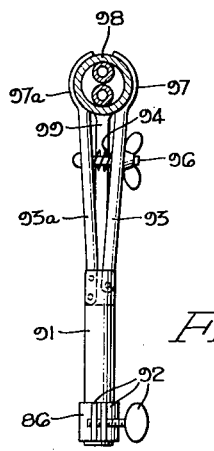
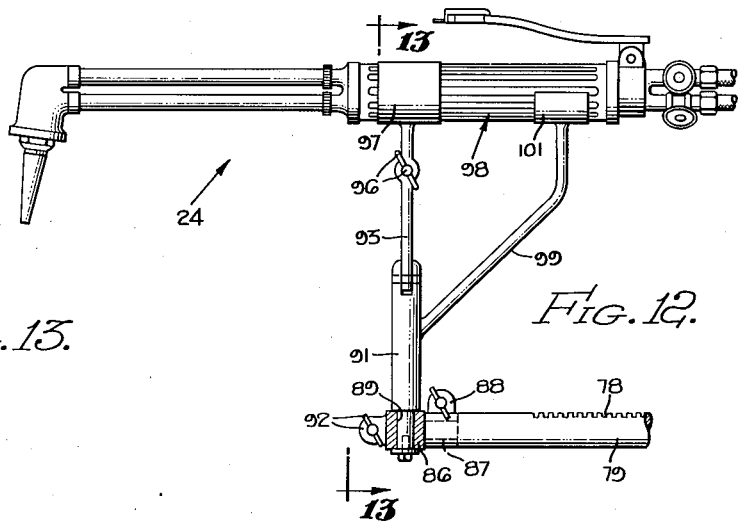
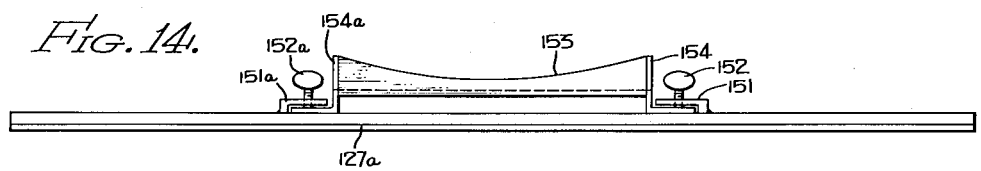
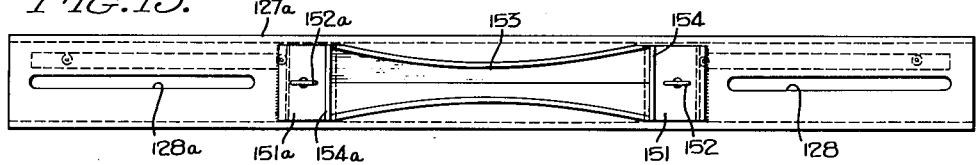
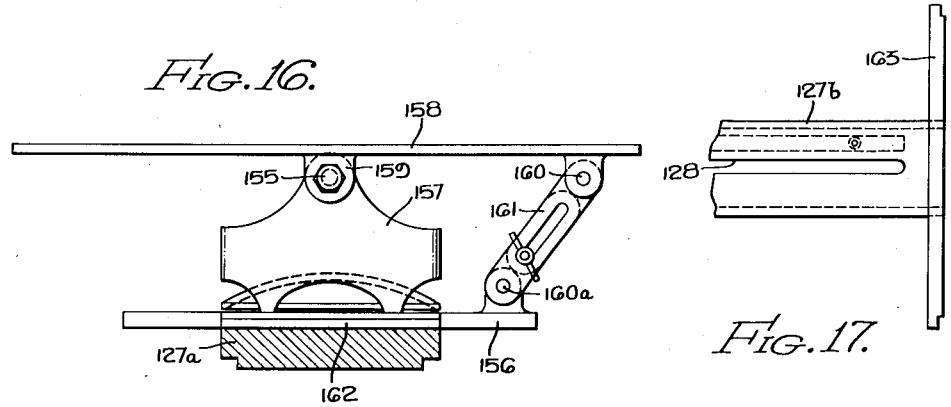
INVENTOR,
JACK A. SCARDINA
BY
ATTORNEY Feb. 14, 1956 J. A. SCARDINA 2,734,737
FLAME CUTTING MACHINE
Filed May 2, 1952 4 Sheets-Sheet 2
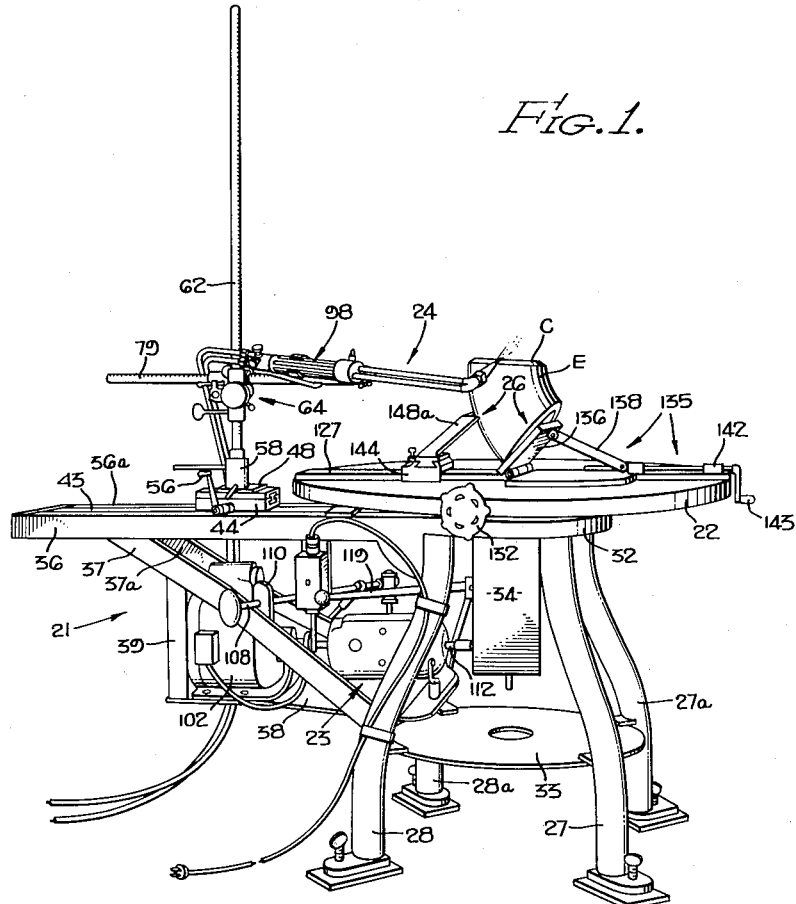
Fig.1.
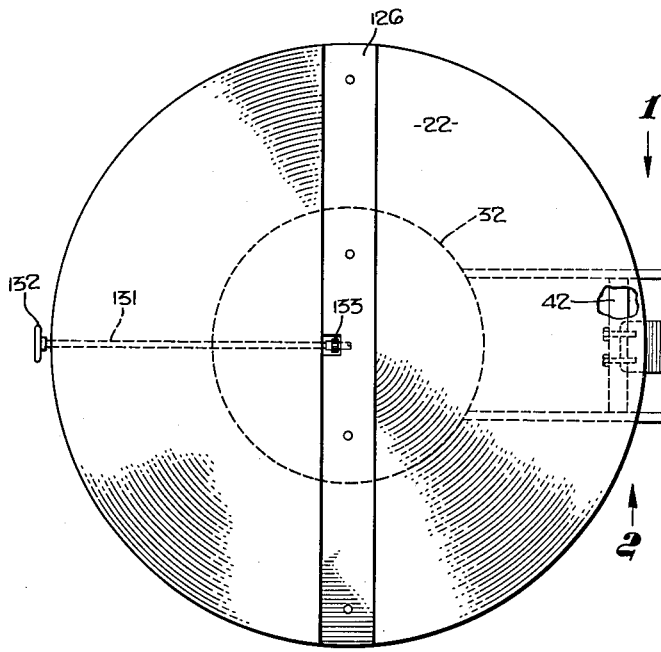
Fig.3.
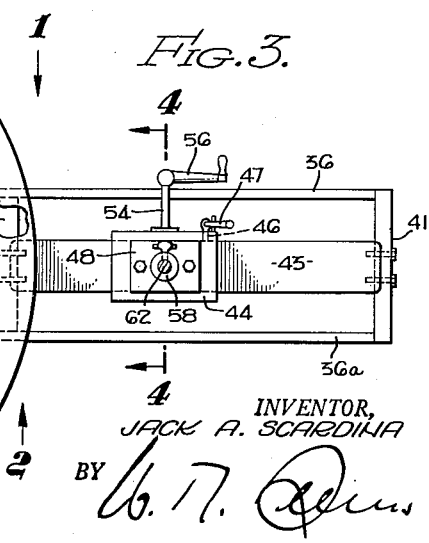
INVENTOR,
JACK A. SCARDINA
BY
ATTORNEY

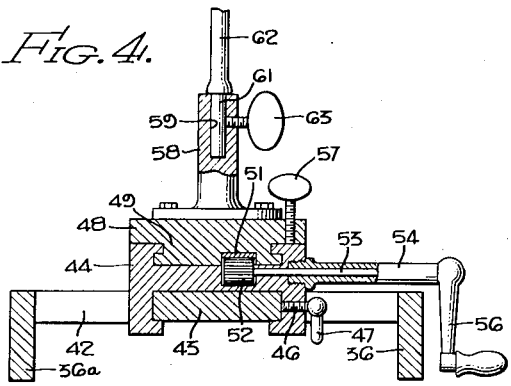
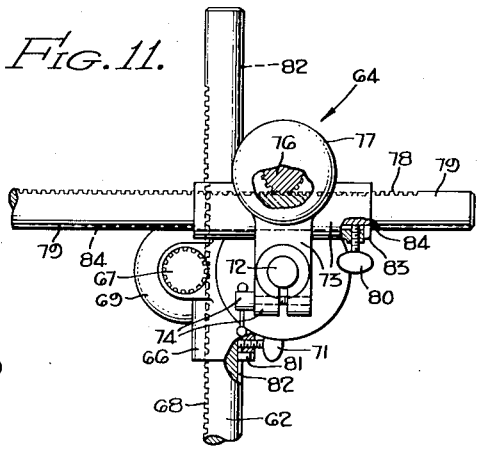
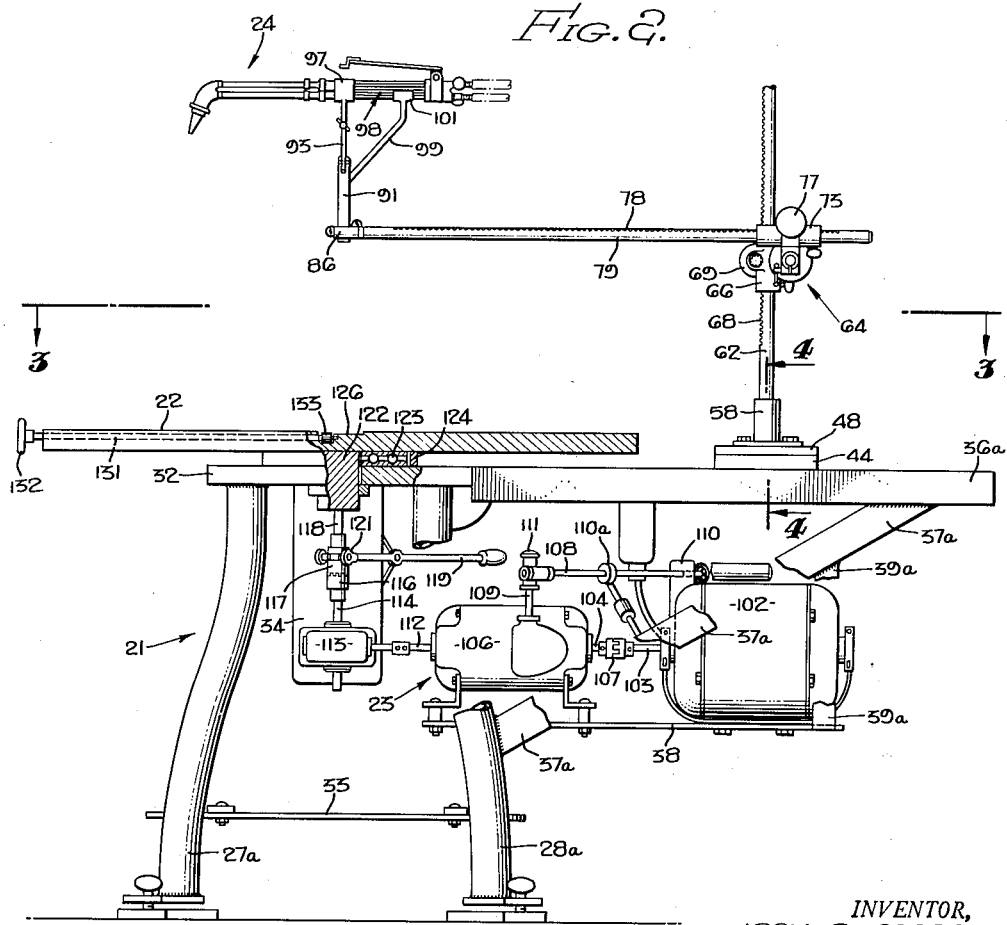

Feb. 14, 1956 — J. A. SCARDINA — 2,734,737
FLAME CUTTING MACHINE
Filed May 2, 1952 — 4 Sheets-Sheet 4
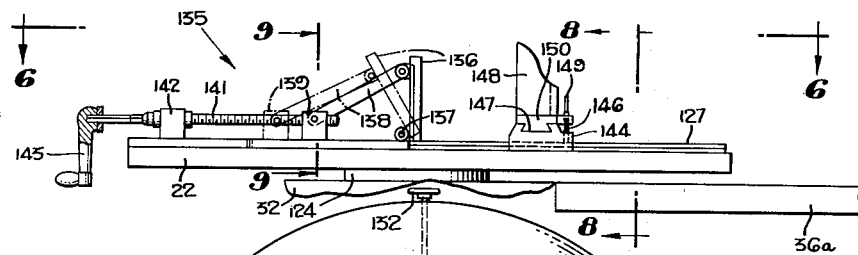
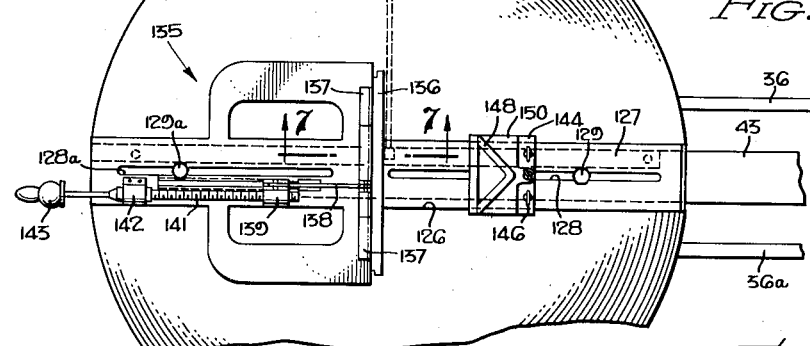
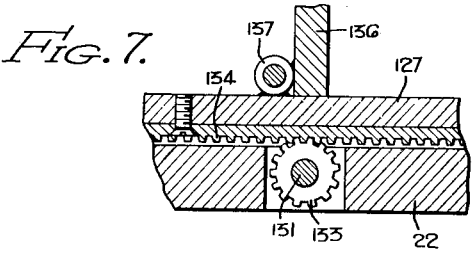
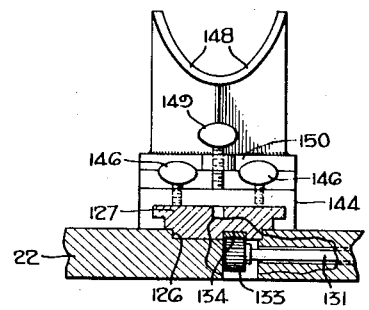
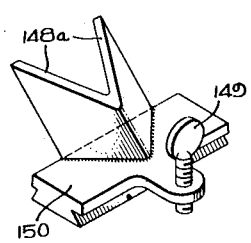
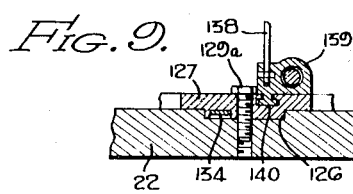
INVENTOR,
JACK A. SCARDINA
BY
ATTORNEY United States Patent Office 2,734,737
Patented Feb. 14, 1956

2,734,737
FLAME CUTTING MACHINE
Jack A. Scardina, Baton Rouge, La.
Application May 2, 1952, Serial No. 285,737
23 Claims. (Cl. 266—23)

The present invention relates in general to the art of oxyacetylene torch cutting and particularly to novel apparatus for automatically effecting torch cuts on various types of work pieces, such as tubular pipe fittings, employed in the fabrication of welded pipe systems. More specifically the invention comprises a horizontal rotary table adapted to support and rotate a work piece about a desired axis and a cutting torch disposed relative to the table to effect the cutting as the table rotates.

One of the objects of the present invention is to provide apparatus of the type referred to which, by the use of certain work-supporting devices, cutting speed controls, and torch adjustments, may effect desired cuts on work pieces varying widely in configuration and size.

Another object of the invention is to provide a table with adjustable support means carried thereby which may be readily adjusted to dispose a work piece for rotation about a desired axis of rotation.

Another object of the invention is to provide for the table of an apparatus of the type referred to various attachments in the form of work-supporting jigs to enable the apparatus to effect cuts on a wide variety of work pieces.

These and other objects, and their manner of attainment, will become apparent from a consideration of the specification to follow, the appended claims, and the accompanying drawings, in which:

Figure 1 is a front perspective of the subject of the invention as viewed in the direction of arrow 1, Figure 3;

Figure 2 is a rear elevation thereof as viewed in the direction of arrow 2, Figure 3, certain portions being broken away and shown in section;

Figure 3 is a top plan view of the table and supporting structure viewed from the plane of line 3—3, Figure 2;

Figure 4 is an enlarged section upon line 4—4 of Figures 2 and 3;

Figure 5 is a fragmentary side elevation of the rotary table illutrating certain forms of work-supporting devices employed therewith;

Figure 6 is a fragmentary top plan view of the rotary table viewed from the plane of line 6—6 of Figure 5;

Figure 7 is an enlarged fragmentary section on line 7—7 of Figure 6;

Figure 8 is an enlarged section along line 8—8 of Figure 5, a portion being broken away and shown in section;

Figure 9 is an enlarged section along line 9—9 of Figure 5;

Figure 10 is an enlarged perspective of a detail of Figure 1;

Figure 11 is an enlarged side elevation of the operator-adjustable torch arm support, portions being broken away and shown in section;

Figure 12 is a side elevation of the outer end of the torch support arm;

Figure 13 is a section upon line 13—13, Figure 12;

Figure 14 is a side elevation of an alternative form of jig support;

Figure 15 is a top plan view of the structure shown in Figure 14;

Figure 16 is a side elevation of another form of jig which may be employed with the support bar shown in Figures 14 and 15, the support bar being shown in section; and Figure 17 is a fragmentary top plan view of another form of jig.

Referring in greater detail to the drawings, and particularly to Figures 1 to 3, the invention is seen to comprise a frame, generally indicated by the reference character 21, supporting a horizontal flat table or platen 22 rotatable about a vertical axis, an adjustable driving mechanism 23 for rotating the table, a cutting torch 24 adjustable relative to the table and to a work piece supported thereby, and suitable work-supporting means 26 carried by the table, which may vary according to the nature of the work piece.

The component parts of frame 21 comprise a plurality of spaced tubular legs 27, 27a, 28, and 28a rigidly secured at their upper ends to a horizontal bearing plate 32 and intermediate their ends to a horizontal platform 33. A vertical plate 34 is rigidly secured at its upper end to bearing plate 32. A pair of parallel horizontal frame members 36, 36a are secured at their inner ends to bearing plate 32 and are supported at their outer ends by a pair of braces 37, 37a, the lower ends of which are secured to legs 28 and 28a, respectively. A horizontal support plate 38 has its opposite edges at its inner end secured to legs 28, 28a, its outer end being supported by depending elements 39, 39a depending from the members 37 and 37a. A spacer bar 41 connects the outer ends of members 36 and 36a and a similar bar 42 performs a similar reinforcing function intermediate their ends. A parallel rectangular support or guide bar 43 is disposed between members 36, 36a, being secured at its ends to the spacer bars 41 and 42. The components of the frame construction described may be secured together in any suitable manner, as by welding, by bolts, or otherwise, as will be apparent to those skilled in the art.

Guide bar 43 forms the supporting base for torch 24 which is adjustable as will now be described. A carriage comprising a slide block 44, clearly shown in Figures 3 and 4, is slidably carried by guide bar 43 for longitudinal movement therealong and may be locked in at any desired position or adjustment by a locking set screw 46 threadedly engaging block 44 with its inner end movable into contact with the side of guide bar 43. A lever 47 forming an integral part of screw 46 is provided for rotating the latter. A block 48 is slidably secured to slide block 44 by T-slot machine guide 49 and is provided with rack teeth 51 on its lower surface engageable with a pinion 52 on the inner end of shaft 53. The latter is journaled in bearing 54 carried by slide block 44, and may be rotated by crank 56 at its outer end. Block 44 is freely slidable on guide 43 with the lock screw 46 released and major adjustments are accomplished by its movement. The adjustment of the block 48 on block 44 is in the nature of a micro-adjustment. It is apparent that with slide block 44 locked to guide bar 43 upon crank 56 being rotated slide block 48 will be moved inwardly toward or outwardly from table 22, depending upon the direction of rotation of the crank. A vertical locking screw 57 is threadedly seated in block 48 with its lower end movable into abutting locking contact with the top face of slide block 44. With screw 57 tightened blocks 44 and 48 are locked together preventing relative sliding movement.

A support member 58 is rigidly affixed to the top of block 48 and is formed with a vertical cylindrical socket 59 which receives the lower cylindrical end 61 of vertical rod or post 62. Rod 62 may be rotated about its vertical axis and may be secured against such rotation by a locking screw 63 threadedly mounted in support member 54.

An adjustable rod coupling indicated generally by the reference character 64 and best shown in Figure 11 is adjustably mounted on rod 62. Coupling 64 comprises a body member 66 having a vertical circular bore slidably enclosing rod 62 and which carries a rotatable stem pinion 67 engageable in the bore with rack teeth 68 on rod 62. A manually rotatable knob 69 is affixed to the stem end of pinion 67 to effect vertical movement of the coupling along the rod. A releasable wing screw 71 carried by member 66 locks the latter in a desired vertical position on post 62. Body member 66 also carries a horizontal circular pin 72 extended at right angles to post 62 and upon which is journaled a second body member 73. Body member 73 may be locked in a desired position of adjustment on its support pin 72 by squeeze clamp and screw 74. Body member 73 rotatably carries a stem pinion 76 and a knob 77 secured to it which form a cooperative unit similar to that comprising stem pinion 67 and knob 69 carried by body 66. Body member 73 is formed with a bore similar to the bore of body member 66. Through its bore extends a rod 79 formed with rack teeth 78 which engage the pinion 76. Rotation of the latter adjusts the rod 79 relative to body member 73, a locking set screw 80 retaining it in any desired adjustment. A key 81 carried by member 66 and slidable in a keyway 82 in rod 68 prevents rotation of coupling 64 about the axis of post 62 and a similar key 83 on member 73 and slidable in a keyway 84 in rod 79 prevents rotation of the latter about its own longitudinal axis.

The outer end of rod 79, the left end as shown in Figures 2 and 12, is provided with a connector or coupling 86 having a bore 87 which receives the end of rod 79, being selectively clamped in any desired angular position by a squeeze clamp and screw 88 similar to clamp and screw 74. A bore 89 in connector 86 at right angles to bore 87 rotatably receives a post 91 forming the lower portion of a torch clamp, a squeeze clamp and screw 92 being provided to clamp post 91 against rotation in bore 89. At its opposite end post 91 carries a pair of clamp arms 93, 93a, the latter being rigidly secured to post 91 while arm 93 is pivotally connected thereto. The arms 93 and 93a are urged apart by a coil spring 94 and may be forced together by wing nut and screw 96. The outer ends of arms 93, 93a are provided respectively with arcuate jaws 97, 97a which seat the cylindrical body of a torch 98. A brace 99 extends outwardly and upwardly and is formed at its outer end with an arcuate saddle 101 upon which the body of torch 98 rests. The construction of torch 98 is not a part of this invention and it may be understood to be conventional and typical of an oxy-acetylene welding or cutting torch.

The table drive mechanism, as shown in Figures 1 and 2, comprises an electric motor 102 mounted upon plate 38 with its shaft 103 connected by a flexible coupling 107 to a power input shaft 104 of a speed change mechanism 106. The speed change mechanism may be of any well-known type and as illustrated is of the well-known Vickers hydraulic type which provides a wide range of infinitely variable speed changes. These changes are effected by a manually adjustable rotary control shaft 108 supported by bearing bracket 110 secured to brace 37 and bearing bracket 110a secured to brace 37a. Rotation of control shaft 108 actuates a control rod 109 through suitable mechanism contained in housing 111, details of which are omitted since they are well understood in the art of speed changers of this type. It is to be understood that rotation of control shaft 108 effects changes of rotational speed of power output shaft 112 and also controls its direction of rotation. Shaft 112 is coupled to a speed reducer 113, which may be of the worm and worm wheel type, which is mounted on plate 34. The output shaft 114 of the speed reducer 113 is provided with a dog clutch member 116, the teeth of which engage the teeth of a similar member 117 slidably splined on shaft 118. A control lever 119 is pivotally carried by plate 34 and is provided with a conventional yoke 121 engaging a groove in member 117. It will be apparent that pivotal movement of lever 119 connects or disconnects shaft 118 from shaft 114, depending upon the direction of movement of the lever. Table 22 is provided with a journal 122 mounted rotatably in bearing plate 32 with its lower end connected to shaft 118. A thrust bearing 123 is disposed between the lower face of the table and the top face of bearing plate 32 to absorb the downward thrust load of the table. An annular ring 124 carried by the table surrounds the thrust bearing to prevent the entry of foreign matter.

On its top face table 22 is provided with a diametrically extending slot or channel 126 which slidably receives the jig or fixture support bar 127. The latter, as is shown in Figure 6, is formed with slots 128, 128a through which extend, respectively, vertical clamping screws 129, 129a threadedly engaging the table 22. Support bar may be moved bodily to various positions across the diameter of the table and rigidly secured to the latter. To effect this movement a radially extending shaft 131 is rotatably mounted in the table 22 and extends perpendicular to channel 126. The outer end of shaft 131 carries a hand wheel 132 and fixed to its inner end is a pinion 133 which meshes with rack teeth 134 disposed longitudinally along the lower face of support bar 127.

The elements of the apparatus so far described will, in most cases, be employed for all of the various types of cuts, although it may be desirable to omit support bar 127 in some instances and substitute special jigs adapted to be secured in desired positions on the table top to support work pieces of special or odd configurations. In general, however, support bar 127, or modifications thereof, will be employed with the table. It will be understood, accordingly, that the jigs now to be described and which are employed with support bar 127 are exemplary only and many other forms may be employed.

Referring to Figures 5 and 6, there is shown an example of the jigs just referred to, a tiltable device 135 comprises a plate 136 pivotally connected at its lower end to bar 127 by a hinge 137. A link 138 connects pivotally to plate 136 and at its opposite end to a nut 139 which is machine-guided along bar 127 in T-slot 140, as shown in Figure 9. A screw 141 threadedly engages nut 139 and has an intermediate unthreaded portion journaled in a fixed bearing 142 mounted on bar 127. Its free end beyond the bearing carries a crank 143. Rotation of crank 143 and connected screw 141 will move nut 139 along T-slot guide 140 and link 138 will effect tilting of plate 136. Two positions of plate 136 are shown in the full and dotted line position of Figure 5. A T-slotted slide member 144 engages support bar 127 for slidable adjustment along the latter and may be clamped thereto in a desired position by one or more wingscrews 146. Member 144 is provided with a transverse dovetail slot 147, as shown in Figure 5, extending horizontally and perpendicular to the longitudinal axis of bar 127 and which slidably receives a chuck member 148 having V-shaped jaws and a base portion 150 shaped to slide on the dovetail slot. A wingscrew 149 is provided for locking the chuck member to member 144 in a desired position. In using the construction just described the V-shaped jaws of chuck 148 will normally be employed to engage a tubular member with its axis perpendicular to the table, the work-engaging face of plate 136 being disposed in a vertical position.

Referring to Figures 1 and 10, a tiltable device 135, previously described, may be employed with a chuck 148a, the jaws of which are disposed angularly rather than vertically, as in Figures 5 and 6. The lower face of an elbow E rests on plate 136 and is held thereagainst by jaws 148a. The angle of the plane of the lower face of the elbow may be angularly adjusted to effect a cut C at a desired angle to the plane of the lower face.

Figures 14 and 15 illustrate a modified form of support bar 127a similar to bar 127 except that the tilting device 135, previously described, is omitted. Bar 127a has a pair of clamp members 151, 151a on its top side provided, respectively, with wingscrews 152, 152a. A jig comprising an upwardly opening angle iron 153, to the ends of which are secured outwardly facing angle irons 154, 154a, is detachably secured to bar 127a, the horizontal flanges of angle irons 154 and 154a being disposed beneath clamp members 151 and 151a, respectively. The tightening of screws 152 and 152a secures the jig in place, lateral adjustment being accomplished by loosening the screws. This particular jig is desirable for supporting T fittings, the straight run of the fitting lying on angle iron 153.

Figure 16 illustrates another type of jig for supporting flanges or other flat work pieces. This device comprises a circular base plate 156 above which extends a circular tubular post 157. A circular table 158 is pivotally mounted on post 157 by spaced depending ears 159 connected to the post by bolts 155. A slotted adjustable length link 161 is pivotally connected at its ends at 160 and 160a to the table and base plate, respectively, to effect securement of the table in a desired angular position. Base plate 156 is provided with projecting ears 162, of which one is shown in Figure 16, on diametrically opposite sides which may be disposed beneath clamp members 151, 151a of bar 127a, shown in Figures 14 and 15. Pipe flanges or flat work pieces may be disposed on the top of table 158.

Figure 17 illustrates another form of support bar 127b having a fixed vertically extending flat plate 163. Plate 163 forms a suitable abutment for one end of a large L fitting when supported by the support bar.

In the operation of the machine it will be assumed that it is desired to cut a straight piece of pipe to a desired length. Assuming that a first end of the pipe has previously been cut as desired, that end is positioned to rest on the top of support bar 127 in contact with the abutting V jaws of chuck 148. Pivoted plate 136 is moved toward and into contact with the pipe by rotating crank 143 to advance nut 139 and link 138 and the pipe is thus clamped in place. Support member 127 is then adjusted across table 22 to align the vertical axis of the pipe with the axis of rotation of the table. The V jaws of chuck 148 may be shifted laterally, that is, perpendicular to the length of member 127. Set screw 149 would be loosened and again tightened in making such lateral shift. Assuming now that the axis of the pipe to be cut is aligned with the axis of rotation of the table, its periphery will be concentric with such axis. If a straight cut is desired, that is, a cut producing a flat end lying in a plane, the torch tip will be adjusted by the various adjustments described to a position adjacent the pipe so that the flame will be directed horizontally. The variable speed mechanism 23 is then adjusted to fix the speed of table rotation and accordingly the rate of cut. As the table rotates a cut will be effected in a plane parallel to the table and at a predetermined distance above the lower end of the pipe. Should a beveled cut be desired rather than the straight cut just described the torch will be adjusted so that the flame will be directed at an angle to the horizontal, that is, directed at an angle to the horizontal, that is, directed upwardly for an outside bevel, as shown in Figure 1, or downwardly for an inside bevel.

If it be desired to effect a cut on an elbow as illustrated in Figure 1, plate 136 will be tilted to the necessary angle and jaw 148a employed in place of jaw 148. The torch may be adjusted to effect straight or bevel cuts as previously described in connection with the exemplary cuts on a straight pipe.

If a cut is desired on the lateral run of a pipe T the straight run of the pipe is disposed in the horizontal V member 153 of the jig shown in Figure 14 with the lateral run extending vertically concentric to the axis of rotation of the table. This would require, of course, the substitution of the support bar 127a for 127. The adjustments, after once being made, will produce identical cuts on subsequent T's. If the T is quite large support bar 127b may be employed, plate 163 serving as an abutment for one end of the horizontal run of the T and a V member, similar to member 154, carried by the support bar supporting the straight run of the T.

Slide block 48 may be adjusted by the rotation of crank 56 in any of the procedures described to adjust the position of the torch tip. The principal use of this adjustment, however, is in the reaming of holes. For example, with the torch adjusted to direct its flame in a downward direction adjacent a hole in a work piece it may be desired to ream or enlarge the hole. A mark is placed on the work piece at the desired radius of the hole and crank 56 operated to move the torch tip radially outwardly to the mark. As will be apparent, subsequent cuts to the same dimension may be made with the torch so adjusted. If a cut is desired on a flat plate or pipe flange, the jig shown in Figure 16 is employed. Assuming that the finished work piece will be larger in diameter than sub-table 158 the work piece may rest directly on the top of the sub-table and the cut of desired diameter made, the flame of the torch in this case being directed downwardly, either vertically or angularly, depending upon whether a cylindrical cut or a conical cut is being made. If the cut is of smaller size and within the limits of the sub-table the work piece may be supported in spaced relation above the sub-table 158 by a plurality of suitable radially extending spacers, preferably three, disposed equi-angularly, to protect the sub-table from direct contact of the cutting flame. It will be apparent that if a cut is desired at an angle to the plane of the sub-table, the latter may be tilted and secured at a desired angle by the use of the sloted linkage 101. It is apparent that support bar 127, or modifications thereof, may be employed with various jigs, the jigs described being exemplary only.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A flame cutting apparatus comprising; a support bar mounted for rotation about a substantially vertical axis, means for adjusting said support bar in a plane perpendicular to said axis, means for rotating said support bar about said axis, work-supporting means carried by said support bar and adapted to support a work piece upon which a flame cut is desired, with a selected axis of the work piece disposed on said vertical axis, and a flame cutting torch disposed in flame cutting relationship to the work piece and adapted to effect a cut on the latter as it rotates with the support bar.

2. Apparatus in accordance with claim 1 wherein a rotary table supports said support bar which is adjustable diametrically thereof.

3. Apparatus in accordance with claim 2 wherein the table is provided with a substantially diametrically extending slot adapted to slidably receive said support bar, means for moving said support bar in the slot and including rack teeth carried by the support bar and a pinion engageable with the rack teeth, and means provided adjacent the outer edge of the table for rotating the pinion, whereby the support bar may be bodily moved diametrically across the table to a desired position relative thereto.

4. A flame cutting apparatus comprising; a circular table mounted for rotation about a substantially vertical axis, means for rotating the table at a desired angular velocity about said axis, a support bar carried by the top of the table, means for diametrically adjusting said support bar across said table, work piece supporting means carried by the support bar, and a flame cutting torch disposed in flame cutting relationship to a work piece and held by the work piece supporting means to effect a cut on the work piece as it rotates with the table.

5. Apparatus in accordance with claim 4 wherein said means for rotating the table comprises an electric motor, a variable speed power transmission device operatively connected to the motor, and means drivingly connecting said device to the table, said last-named means including a manually operable clutch.

6. A flame cutting apparatus comprising; a frame, a turntable mounted on the frame for rotation about a substantially vertical axis, a work support carried by the turntable and adapted to hold a work piece upon which a flame cut is desired, said work support being adjustable diametrically of said table, a substantially horizontal guide member carried by the frame and extending outwardly therefrom in a direction substantially radially of the table, a torch support carriage slidably mounted on the guide member for positioning at a desired radial distance from the axis of rotation of the table, and a cutting torch supported by said torch carriage and adapted to direct flame against a work piece held by said work support.

7. Apparatus in accordance with claim 6 wherein said carriage includes a pair of relatively movable members, the first member being slidably carried by said guide member and the second member being slidably carried by the first member for movement in a direction parallel to the guide member.

8. Apparatus in accordance with claim 7 including a toothed rack carried by said second member, a pinion rotatably carried by the first member and meshing with the rack, and manual means for rotating the pinion.

9. Apparatus in accordance with claim 6 including a vertical elongated post supported at its lower end by said carriage, said post being rotatable about its vertical axis, a rod coupling device having a first portion slidably carried by said post for vertical movement therealong, and a second portion pivotally connected to the first portion for angular adjustment relative to the first portion about a horizontal axis, a rod slidably carried by said second portion of said coupling device for bodily movement in a vertical plane, and means at one end of said rod for supporting said cutting torch.

10. Apparatus in accordance with claim 9 wherein the last-named means is constructed and arranged to enable said torch to be adjusted about the longitudinal axis of said rod and about an axis perpendicular to the longitudinal axis of said rod.

11. Apparatus in accordance with claim 10 wherein said last-named means includes a pair of relatively movable clamping jaws adapted to engage the body of the torch, and a support bracket having a saddle in which the torch body may rest.

12. A flame cutting apparatus comprising; a rigid frame, a turntable rotatably carried by said frame for rotation about a substantially vertical axis, a speed reducer power transmission device carried by the frame and disposed below said turntable and operatively connected for rotating the latter, a variable speed power transmission device carried by the frame and operatively connected to the speed reducer device, an electric motor carried by the frame and operatively connected to the variable speed device, a support bar adjustably carried by said turntable for movement substantially diametrically thereacross, and a flame cutting torch adjustably carried by the frame over said turntable and adapted to be positioned relative to a work piece carried by said support bar.

13. A flame cutting apparatus comprising; a turntable mounted for rotation about a substantially vertical axis, a support bar carried by the top of the table, means to adjust said support bar substantially diametrically of said table, means for rotating the table at a desired angular velocity, and means for adjustably supporting a flame cutting torch in a desired position relative to a work piece carried by said support bar, said last-named means including; means for rotating the torch about a vertical axis, means for adjusting the torch in a vertical direction, means for adjusting the torch in a generally horizontal axial direction to and from said last-named vertical axis, means for rotating the torch about its axis, and means for adjusting the torch about an axis perpendicular to its axis.

14. Apparatus in accordance with claim 13 wherein the means for adjusting the torch in a generally horizontal direction is constructed and arranged to enable the torch to swing about a horizontal axis.

15. In a flame cutting apparatus comprising a rotatable turntable and a flame cutting torch adjustably supported above said turntable, a support bar mounted on said turntable for adjustment relative to the axis of turntable rotation, and a work-supporting fixture mounted on said support for adjustment therewith and relative thereto.

16. The construction recited in claim 15 characterized in that said support bar and said turntable are provided with cooperating rack and pinion means to effect the adjustment of said support bar on said turntable.

17. The construction recited by claim 15 characterized in that said fixture is mounted on said support bar for lateral adjustment relative thereto.

18. The construction recited by claim 15 characterized in that said fixture is mounted on said support bar for pivotal angular adjustment relative thereto.

19. The construction recited by claim 15 characterized in that a post extends vertically and parallel to the axis of rotation of said turntable and at the side thereof, a horizontal rod extends from said post and over said turntable, a connector mounts said rod on said post for vertical, horizontal or angular adjustment relative thereto, and a support at the outer end of said rod adjustably supports said torch for adjustment relative to said rod.

20. The construction as claimed in claim 19, wherein racks and pinion means are provided for vertically moving said connector on said post, and separate racks and pinion means are provided for moving said horizontal rod relative to said connector.

21. A flame cutting apparatus, comprising a generally horizontal support member adapted to be rotated about a vertical axis, a plate hingedly connected at its lower end to said support member, a fixture mounted on said support member and provided with a groove opening toward said plate, means to pivotally adjust said plate to clamp a workpiece into said groove, and a cutting torch mounted adjacent said workpiece to effect a cut thereon during rotation of said support member about said axis.

22. The invention as claimed in claim 21, wherein means are provided to adjust said support member relative to said vertical axis.

23. The invention as claimed in claim 21, wherein said adjustment means include a lead screw pivotally associated with the upper end of said plate.

References Cited in the file of this patent

UNITED STATES PATENTS

| 2,057,612 | Formont | Oct. 13, 1936 |
| 2,383,607 | Lovers et al. | Aug. 28, 1945 |
| 2,384,128 | Nation | Sept. 4, 1945 |
| 2,652,243 | Reed | Sept. 15, 1953 |

FOREIGN PATENTS

| 412,788 | Germany | Aug. 27, 1925 |